United States Patent
Hayama et al.

(10) Patent No.: US 11,326,707 B2
(45) Date of Patent: May 10, 2022

(54) CAPACITY CONTROL VALVE AND CONTROL METHOD OF CAPACITY CONTROL VALVE

(71) Applicant: EAGLE INDUSTRY CO., LTD., Tokyo (JP)

(72) Inventors: Masahiro Hayama, Tokyo (JP); Yoshihiro Ogawa, Tokyo (JP); Keigo Shirafuji, Tokyo (JP); Kohei Fukudome, Tokyo (JP); Takahiro Ejima, Tokyo (JP); Daichi Kurihara, Tokyo (JP); Wataru Takahashi, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 16/961,620

(22) PCT Filed: Jan. 21, 2019

(86) PCT No.: PCT/JP2019/001569
§ 371 (c)(1),
(2) Date: Jul. 10, 2020

(87) PCT Pub. No.: WO2019/142930
PCT Pub. Date: Jul. 25, 2019

(65) Prior Publication Data
US 2021/0190228 A1    Jun. 24, 2021

(30) Foreign Application Priority Data

Jan. 22, 2018  (JP) .............................. JP2018-008481

(51) Int. Cl.
| | | |
|---|---|---|
| F16K 31/06 | (2006.01) | |
| F04B 49/22 | (2006.01) | |
| F16K 1/44 | (2006.01) | |

(52) U.S. Cl.
CPC .......... *F16K 31/0627* (2013.01); *F04B 49/22* (2013.01); *F16K 1/44* (2013.01)

(58) Field of Classification Search
CPC ...... F16K 1/44; F16K 31/0627; F16K 31/613; F04B 27/18; F04B 27/1804; F04B 49/22
See application file for complete search history.

(56) References Cited

U.S. PATENT DOCUMENTS

| | | | |
|---|---|---|---|
| 9,732,874 B2 * | 8/2017 | Saeki | F16K 31/0603 |
| 2007/0264134 A1 * | 11/2007 | Hirota | F04B 27/1804 |
| | | | 417/222.2 |
| 2009/0183786 A1 | 7/2009 | Iwa et al. | |

FOREIGN PATENT DOCUMENTS

| | | |
|---|---|---|
| JP | 2005307817 A | 11/2005 |
| JP | 2012211579 A | 11/2012 |

(Continued)

OTHER PUBLICATIONS

International Search Report (ISR) dated Apr. 16, 2019, issued for International application No. PCT/JP2019/001569. (2 pages).

*Primary Examiner* — Umashankar Venkatesan
(74) *Attorney, Agent, or Firm* — Hayes Soloway P.C.

(57) ABSTRACT

A capacity control valve (1) includes a valve main body (10) having a first communication passage (11), a second communication passage (12), a third communication passage (13), and a main valve seat (15a), a valve element (20) having an intermediate communication passage (29), a main valve portion (21c), and an auxiliary valve portion (23d), and a solenoid (30) having a plunger (35) that drives a first rod (136) and a second rod (36). The first rod (136) opens and closes the main valve portion (21c), and the second rod (36) opens and closes the auxiliary valve portion. The capacity control valve is capable of efficiently discharging a (Continued)

liquid coolant irrespective of pressure of a suction chamber and lowering drive force of a compressor at a liquid coolant discharging operation.

6 Claims, 6 Drawing Sheets

(56) References Cited

FOREIGN PATENT DOCUMENTS

| | | |
|---|---|---|
| JP | 5167121 B2 | 3/2013 |
| JP | 2014080927 A | 5/2014 |
| JP | 2014092207 A | 5/2014 |
| JP | 2014095463 A | 5/2014 |
| JP | 2016196825 A | 11/2016 |
| JP | 2017089832 A | 5/2017 |

* cited by examiner

CAPACITY CONTROL VALVE AND CONTROL METHOD OF CAPACITY CONTROL VALVE

CROSS-REFERENCE TO RELATED APPLICATIONS

This application is the U.S. National Phase under 35 U.S.C. § 371 of International Application PCT/JP2019/001569, filed Jan. 21, 2019, which claims priority to Japanese Patent Application No. JP2018-008481, filed Jan. 22, 2018. The International Application was published under PCT Article 21(2) in a language other than English.

TECHNICAL FIELD

The present invention relates to a capacity control valve and a method for controlling the capacity control valve used for controlling a flow rate or pressure of a variable capacity compressor.

BACKGROUND ART

As the variable capacity compressor, for example, a swash plate type variable capacity compressor used in an air conditioning system of an automobile, etc. includes a rotation shaft to be driven and rotated by rotation force of an engine, a swash plate coupled to the rotation shaft so that a tilting angle is variable, and compressing pistons coupled to the swash plate, etc., and is to change strokes of the pistons and control a discharge amount of a coolant by changing the tilting angle of the swash plate.

This tilting angle of the swash plate can be continuously changed by appropriately controlling pressure in a control chamber by using a capacity control valve to be driven and opened/closed by electromagnetic force while utilizing suction pressure of a suction chamber to which the coolant is sucked in, discharge pressure of a discharge chamber from which the coolant pressurized by the pistons is discharged, and control chamber pressure of the control chamber (crank chamber) in which the swash plate is housed, and by adjusting a balance state of pressure acting on both surfaces of the pistons.

FIG. 5 shows an example of such a capacity control valve. A capacity control valve 160 includes a valve portion 170 having a second valve chamber 182 which communicates with the discharge chamber of the compressor via a second communication passage 173, a first valve chamber 183 which communicates with the suction chamber via a first communication passage 171, and a third valve chamber 184 which communicates with the control chamber via a third communication passage 174, a pressure-sensitive body 178 arranged in the third valve chamber, the pressure-sensitive body to be extended and contracted by peripheral pressure, the pressure-sensitive body having a valve seat body 180 provided in a free end in the extending and contracting direction, a valve element 181 having a second valve portion 176 which opens and closes a valve hole 177 providing communication between the second valve chamber 182 and the third valve chamber 184, a first valve portion 175 which opens and closes the first communication passage 171 and a distribution groove 172, and a third valve portion 179 which opens and closes the third valve chamber 184 and the distribution groove 172 by engagement with and disengagement from the valve seat body 180 in the third valve chamber 184, a solenoid portion 190 which applies electromagnetic drive force to the valve element 181, etc.

In this capacity control valve 160, without providing a clutch mechanism in the variable capacity compressor, in a case where the need for changing the control chamber pressure arises, the pressure (control chamber pressure) Pc in the control chamber and the suction pressure Ps (suction pressure) can be controlled by providing communication between the discharge chamber and the control chamber (hereinafter, referred to as the "conventional art". See Patent Document 1, for example).

CITATION LIST

Patent Documents

Patent Document 1: JP 5167121 P

SUMMARY OF THE INVENTION

Problem to be Solved by the Invention

In the conventional art, in a case where the swash plate type variable capacity compressor is stopped for a long time, a liquid coolant (made by cooling and liquefying a coolant during abandonment) is accumulated in the control chamber (crank chamber). Thus, even when the compressor is started up in this state, it is not possible to ensure a discharge amount as it is set. Therefore, in order to perform desired capacity control immediately after start-up, there is a need for discharging the liquid coolant of the control chamber (crank chamber) as soon as possible.

As shown in FIG. 6, the conventional capacity control valve 160 includes a function of discharging the liquid coolant in order to discharge the liquid coolant of the control chamber (crank chamber) as soon as possible at the time of start-up. That is, in a case where the variable capacity compressor is stopped and abandoned for a long time and then started up, the high-pressure liquid coolant accumulated in the control chamber (crank chamber) flows into the third valve chamber 184 from the third communication passage 174. Then, the pressure-sensitive body 178 is contracted, a part between the third valve portion 179 and the valve seat body 180 is opened, and from the third valve chamber 184 through the auxiliary communication passage 185, the communication passage 186, and the distribution groove 172, the liquid coolant is discharged to the discharge chamber from the control chamber (crank chamber) via the suction chamber and rapidly gasified, so that it is possible to make a cooling operation state for a short time.

However, in the above conventional art, at an initial stage of a liquid coolant discharging process, pressure of the control chamber is high and hence an opening degree of the third valve portion 179 is large. Thus, it is possible to efficiently discharge the liquid coolant. However, as discharge of the liquid coolant progresses and the pressure of the control chamber is lowered, the opening degree of the third valve portion is decreased. Thus, there is a problem that it takes time to discharge the liquid coolant.

Conventionally, at the time of a liquid coolant discharging operation, focus is placed only on how quickly the discharge of the liquid coolant is completed. Thus, control of reducing an engine load is not performed at the time of the liquid coolant discharging operation. However, when the liquid coolant discharging operation is performed with a high engine load, the engine load is further increased, and there is also a problem that energy efficiency of the entire automobile is lowered.

The present invention is achieved to solve the problems of the above conventional art, and an object of the present invention is to provide a capacity control valve and a method for controlling a capacity control valve, capable of, in the capacity control valve that controls a flow rate or pressure of a variable capacity compressor in accordance with a valve opening degree of a valve portion, stably controlling an opening degree of a main valve portion at the time of control, efficiently discharging a liquid coolant irrespective of pressure of a suction chamber, shifting to a cooling operation for a short time, and further lowering drive force of the compressor at a liquid coolant discharging operation.

Means for Solving Problem

In order to solve the foregoing problems, a capacity control valve according to a first aspect of the present invention is a capacity control valve that controls a flow rate or pressure of a variable capacity compressor in accordance with a valve opening degree of a valve portion, the capacity control valve being characterized by including a valve main body having a first communication passage through which a fluid of first pressure passes, a second communication passage arranged adjacent to the first communication passage, the second communication passage through which a fluid of second pressure passes, a third communication passage through which a fluid of third pressure passes, and a main valve seat arranged in a valve hole which provides communication between the second communication passage and the third communication passage, a valve element having an intermediate communication passage providing communication between the first communication passage and the third communication passage, a main valve portion to be separated from and connected to the main valve seat so as to open and close the valve hole, and an auxiliary valve portion arranged in the intermediate communication passage, and a solenoid having a plunger that drives a first rod and a second rod, characterized in that the first rod opens and closes the main valve portion, and the second rod opens and closes the auxiliary valve portion.

According to the first aspect, in a control state, the first rod opens and closes the main valve portion so as to control a capacity control valve, and in liquid coolant discharge, the second rod maintains an opening degree of the auxiliary valve portion in a fully opened state, so that it is possible to efficiently discharge a liquid coolant irrespective of pressure of a suction chamber.

The capacity control valve according to a second aspect of the present invention is characterized in that one end of the first rod is driven by the plunger via a first biasing member, and the other end is connected to the valve element.

According to the second aspect, the first rod transmits drive force of the solenoid to the valve element, so that it is possible to reliably drive the valve element.

The capacity control valve according to a third aspect of the present invention is characterized in that one end of the second rod is connected to the plunger, and the other end is connected to an auxiliary valve seat to be separated from and connected to the auxiliary valve portion.

According to the third aspect, the second rod can open and close the auxiliary valve portion irrespective of the pressure of the suction chamber, so that it is possible to efficiently discharge the liquid coolant.

The capacity control valve according to a fourth aspect of the present invention is characterized in that the solenoid further includes a core arranged between the plunger and the valve main body, an electromagnetic coil, and a second biasing member arranged between the plunger and the core.

According to the fourth aspect, by the second biasing member arranged between the plunger and the core, it is possible to reliably bias the valve element in the valve opening direction of the main valve portion.

The capacity control valve according to a fifth aspect of the present invention is characterized in that the first pressure is suction pressure of the variable capacity compressor, the second pressure is discharge pressure of the variable capacity compressor, and the third pressure is pressure of a crank chamber of the variable capacity compressor. The capacity control valve according to a sixth aspect of the present invention is characterized in that the first pressure is pressure of a crank chamber of the variable capacity compressor, the second pressure is discharge pressure of the variable capacity compressor, and the third pressure is suction pressure of the variable capacity compressor.

According to the fifth or sixth aspect, it is possible to respond to various variable capacity compressors.

In order to solve the foregoing problems, a method for controlling a capacity control valve according to a seventh aspect of the present invention is a method for controlling a capacity control valve, characterized by including the step of making the main valve portion from a closed state to an opened state when the auxiliary valve portion is in an opened state.

According to the seventh aspect, in a state where biasing force of the pressure-sensitive body does not act on the valve element at the time of the liquid coolant discharge, the main valve portion is opened and a flow rate from a discharge chamber to a control chamber is increased, so that it is possible to reduce the load of the compressor.

DESCRIPTION OF EMBODIMENTS

Hereinafter, with reference to the drawings, a mode for carrying out the present invention will be described illustratively based on an embodiment. However, the dimensions, materials, shapes, relative positions, etc. of constituent parts described in this embodiment are not limited only to themselves unless otherwise described particularly explicitly.

Figure 1:
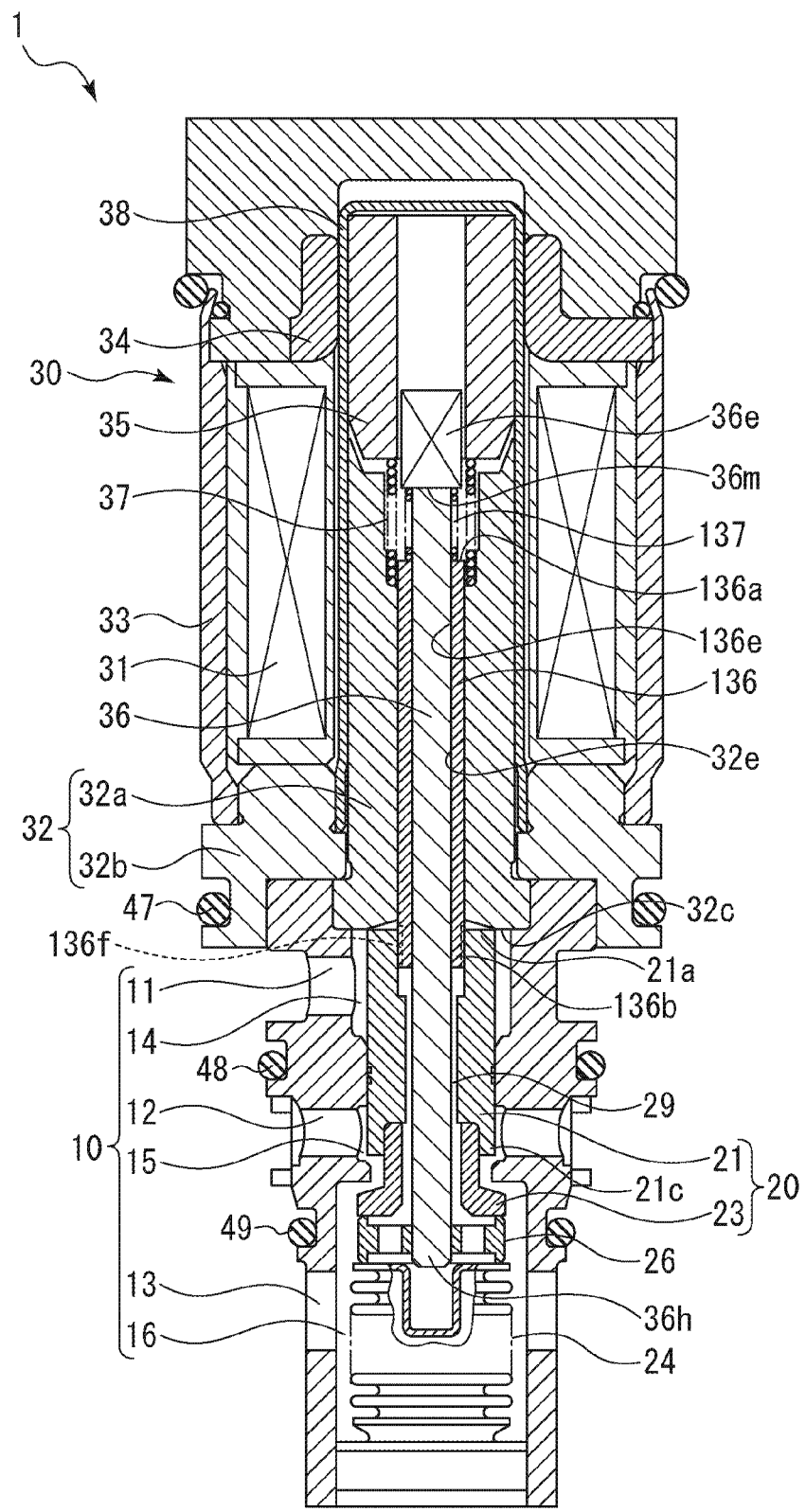
FIG. 1 is a front sectional view of a capacity control valve according to the present invention.

With reference to FIGS. 1 to 4, a capacity control valve according to the present invention will be described. In FIG. 1, the reference sign 1 denotes a capacity control valve. The capacity control valve 1 is mainly formed by a valve main body 10, a valve element 20, a pressure-sensitive body 24, and a solenoid 30.

Figure 2:
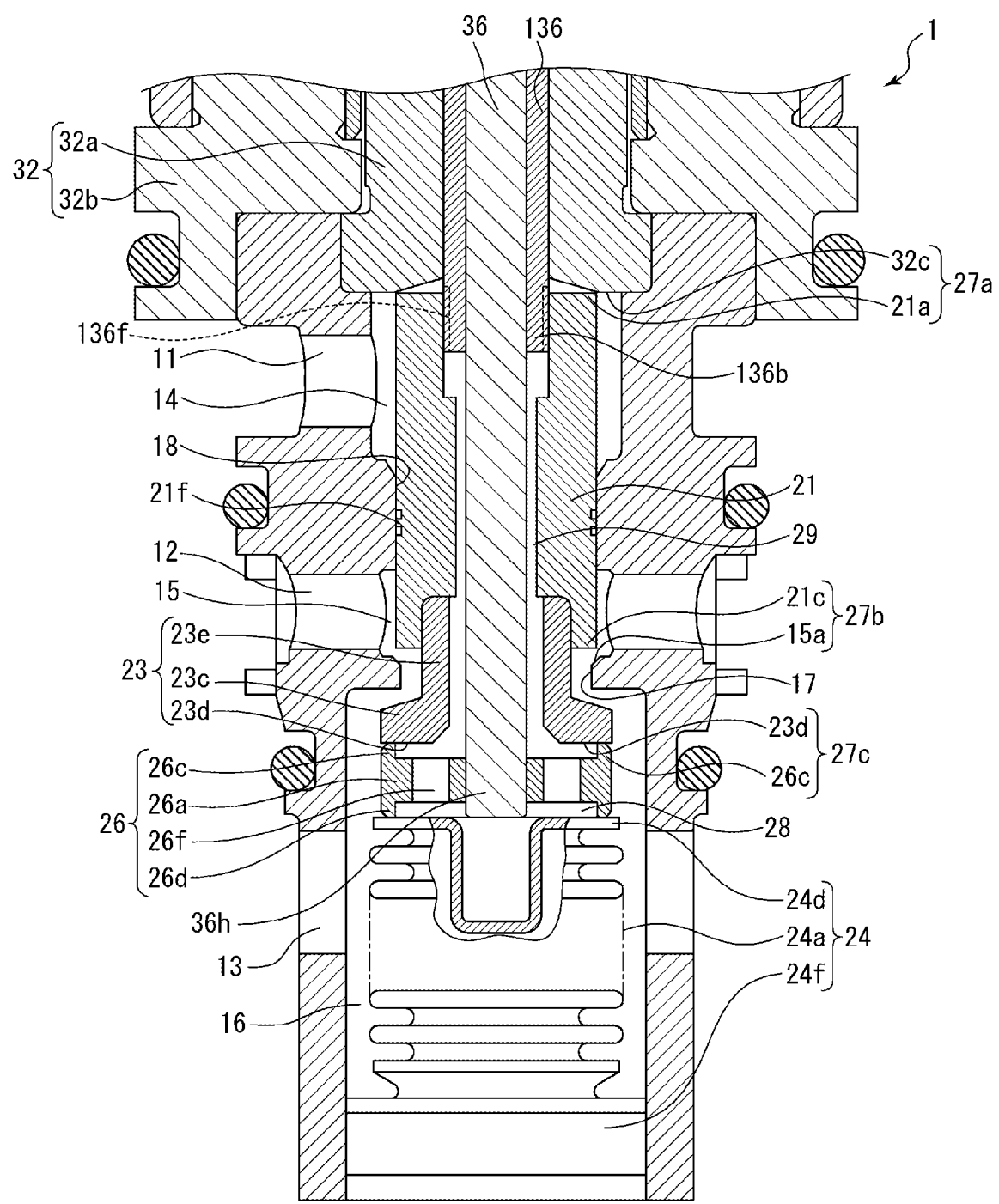
FIG. 2 is an enlarged view of part of a valve main body, a valve element, and a solenoid of FIG. 1 showing the capacity control valve at the time of turning off the solenoid.

Hereinafter, with reference to FIGS. 1 and 2, respective constituent elements of the capacity control valve 1 will be described. The valve main body 10 is made of metal such as brass, iron, aluminum, stainless, or synthetic resin, etc. The valve main body 10 is a cylindrical hollow member having a through hole which passes through in the axial direction. In sections of the through hole, a first valve chamber 14, a second valve chamber 15 adjacent to the first valve chamber 14, and a third valve chamber 16 adjacent to the second valve chamber 15 are continuously arranged.

A second communication passage 12 is continuously provided in the second valve chamber 15. This second communication passage 12 communicates with the inside of a discharge chamber (not shown) of a variable capacity compressor so that a fluid of discharge pressure Pd (second pressure according to the present invention) can flow in from the second valve chamber 15 to the third valve chamber 16 by opening and closing the capacity control valve 1.

A third communication passage 13 is continuously provided in the third valve chamber 16. The third communication passage 13 communicates with a control chamber (not shown) of the variable capacity compressor so that the fluid of discharge pressure Pd flowing in from the second valve chamber 15 to the third valve chamber 16 by opening and closing the capacity control valve 1 flows out to the control chamber (crank chamber) of the variable capacity compressor and a fluid of control chamber pressure Pc (third pressure according to the present invention) flowing into the third valve chamber 16 flows out to a suction chamber of the variable capacity compressor via an intermediate communication passage 29 to be described later and through the first valve chamber 14.

Further, a first communication passage 11 is continuously provided in the first valve chamber 14. This first communication passage 11 leads a fluid of suction pressure Ps (first pressure according to the present invention) from the suction chamber of the variable capacity compressor to the pressure-sensitive body 24 via the intermediate communication passage 29 to be described later, and controls the suction pressure of the compressor to a set value.

Between the first valve chamber 14 and the second valve chamber 15, a hole portion 18 having a diameter smaller than a diameter of any of these chambers is continuously formed. This hole portion 18 slides with a labyrinth 21f to be described later and forms a seal portion that seals a part between the first valve chamber 14 and the second valve chamber 15. Between the second valve chamber 15 and the third valve chamber 16, a valve hole 17 having a diameter smaller than a diameter of any of these chambers is continuously provided. A main valve seat 15a is formed around the valve hole 17 on the second valve chamber 15 side. This main valve seat 15a is separated from and connected to a main valve portion 21c to be described later so as to control opening and closing of a Pd-Pc flow passage providing communication between the second communication passage 12 and the third communication passage 13.

The pressure-sensitive body 24 is arranged in the third valve chamber 16. One end portion of a metal bellows 24a of this pressure-sensitive body 24 is combined to a partition adjusting portion 24f in a sealed state. This bellows 24a is made of phosphor bronze, stainless, etc. and a spring constant of the bellows 24a is designed to be a predetermined value. An internal space of the pressure-sensitive body 24 is vacuum or the air exists in the internal space. Pressure acts on a valid pressure receiving area of the bellows 24a of this pressure-sensitive body 24 so that the pressure-sensitive body 24 is extended and contracted. A flange portion 24d is arranged on the free end portion side of the pressure-sensitive body 24. By directly pressing this flange portion 24d by a locking portion 26 of a second rod 36 to be described later, the pressure-sensitive body 24 is extended and contracted. That is, as described later, the pressure-sensitive body 24 is extended and contracted in accordance with the suction pressure Ps led to the pressure-sensitive body 24 via the intermediate communication passage 29, and also extended and contracted by pressing force of the second rod 36.

The partition adjusting portion 24f of the pressure-sensitive body 24 is sealed, fitted, and fixed so as to close the third valve chamber 16 of the valve main body 10. By screwing the partition adjusting portion 24f and fixing by a locking screw (not shown), it is possible to adjust axial movement of spring force of a compression spring arranged in parallel in the bellows 24a or the bellows 24a.

For example, two to six parts of each of the first communication passage 11, the second communication passage 12, and the third communication passage 13 pass through a peripheral surface of the valve main body 10 at equal intervals. Further, attachment grooves for O rings are provided at three points while being separated in the axial direction on an outer peripheral surface of the valve main body 10. O rings 47, 48, 49 that seal a part between the valve main body 10 and an installment hole of a casing (not shown) fitted to the valve main body 10 are attached to the attachment grooves. Flow passages of the first communication passage 11, the second communication passage 12, and the third communication passage 13 are formed as independent flow passages.

Next, the valve element 20 will be described. The valve element 20 is mainly formed by a main valve element 21 which is a cylindrical hollow member, and an adapter 23. First, the main valve element 21 will be described. The main valve element 21 is a cylindrical hollow member, and the labyrinth 21f is formed in a substantially center portion in the axial direction of an outer peripheral portion of the main valve element. The main valve element is inserted into the valve main body 10, and the labyrinth 21f slides on the hole portion 18 between the first valve chamber 14 side and the second valve chamber 15 side so as to form a seal portion that seals the first valve chamber 14 and the second valve chamber 15. Thereby, the first valve chamber 14 communicating with the first communication passage 11 and the second valve chamber 15 communicating with the second communication passage 12 are formed as independent valve chambers.

The main valve element 21 is arranged on the first communication passage 11 side and on the second communication passage 12 side across the labyrinth 21f. The main valve portion 21c is formed in an end portion of the main valve element 21 arranged on the second communication passage 12 side. The main valve portion 21c is separated from and connected to the main valve seat 15a so as to control opening and closing of the valve hole 17 providing communication between the second communication passage 12 and the third communication passage 13. The main valve portion 21c and the main valve seat 15a form a main valve 27b. A situation where the main valve portion 21c and the main valve seat 15a are brought from a contact state into a separate state will be indicated as the main valve 27b is opened or the main valve portion 21c is opened. A situation where the main valve portion 21c and the main valve seat 15a are brought from a separate state into a contact state will be indicated as the main valve 27b is closed or the main valve portion 21c is closed. A shut-off valve portion 21a is formed in an end portion of the main valve element 21 arranged in the first valve chamber 14. When the solenoid 30 to be described later is turned off, the shut-off valve portion 21a is brought into contact with an end portion 32c of a core 32 so as to shut off communication between the intermediate communication passage 29 and the first communication passage 11. The shut-off valve portion 21a and the end portion 32c of the core 32 form a shut-off valve 27a. The shut-off valve portion 21a and the main valve portion 21c of the valve element 20 perform opening and closing actions in the opposite directions to each other. A situation where the shut-off valve portion 21a and the end portion 32c of the core 32 are brought from a contact state into a separate state will be indicated as the shut-off valve 27a is opened or the shut-off valve portion 21a is opened. A situation where the shut-off valve portion 21a and the end portion 32c of the core 32 are brought from a separate state into a contact state will be indicated as the shut-off valve 27a is closed or the shut-off valve portion 21a is closed.

Next, the adapter 23 forming the valve element 20 will be described. The adapter 23 is mainly formed by a large diameter portion 23c formed to have a large diameter by a cylindrical hollow member, and a tube portion 23e formed to have a diameter smaller than the large diameter portion 23c. The tube portion 23e is fitted to an opening end portion on the main valve portion 21c side of the main valve element 21 so that the valve element 20 is formed. Thereby, the intermediate communication passage 29 passing through in the axial direction is formed in the inside of the main valve element 21 and the adapter 23, that is, the inside of the valve element 20. An auxiliary valve portion 23d is formed in an end portion of the large diameter portion 23c of the adapter 23. The auxiliary valve portion 23d is brought into contact with and separated from an auxiliary valve seat 26c of the locking portion 26 of the second rod 36 so as to open and close the intermediate communication passage 29 providing communication between the first communication passage 11 and the third communication passage 13. The auxiliary valve portion 23d and the auxiliary valve seat 26c form an auxiliary valve 27c. A situation where the auxiliary valve portion 23d and the auxiliary valve seat 26c are brought from a contact state into a separate state will be indicated as the auxiliary valve 27c is opened or the auxiliary valve portion 23d is opened. A situation where the auxiliary valve portion 23d and the auxiliary valve seat 26c are brought from a separate state into a contact state will be indicated as the auxiliary valve 27c is closed or the auxiliary valve portion 23d is closed.

Next, the solenoid 30 will be described. The solenoid 30 mainly includes a first rod 136, the second rod 36, a plunger case 38, an electromagnetic coil 31, the core 32 formed by a center post 32a and a base member 32b, a plunger 35, a plate 34, and a solenoid case 33. The first rod 136 and the second rod 36 are driven in accordance with electric currents supplied from the outside. The plunger case 38 is a bottomed cylindrical hollow member whose one side is open. The plunger 35 is arranged movably in the axial direction with respect to the plunger case 38 between the plunger case 38 and the center post 32a arranged inside the plunger case 38. The core 32 is fitted to the valve main body 10 and arranged between the plunger 35 and the valve main body 10.

An opening end portion of the plunger case 38 is fixed to an inner peripheral portion of the base member 32b of the core 32 in a sealed state, and the solenoid case 33 is fixed to an outer peripheral portion of the base member 32b in a sealed state. The electromagnetic coil 31 is arranged in a space surrounded by the plunger case 38, the base member 32b of the core 32, and the solenoid case 33 and not brought into contact with a coolant. Thus, it is possible to prevent a decrease in insulation resistance.

The first rod 136 is a hollow axial member arranged in the center post 32a of the core 32. The first rod 136 has a clearance from a through hole 32e of the center post 32a of the core 32 so as to be relatively moved with respect to the core 32. One end portion 136a of the first rod 136 is pressed and driven by an end portion 36m of the second rod fixed to the plunger 35 via a spring 137. A communication groove 136f is formed in an outer peripheral portion of the other end portion 136b of the first rod 136, and the end portion 136b and the main valve element 21 are fitted and fixed to each other. Since the communication groove 136f is formed in the outer peripheral portion of the end portion 136b of the first rod 136, even in a state where the end portion 136b and the main valve element 21 are fitted to each other, the intermediate communication passage 29 is not closed and a flow of the coolant is not inhibited.

The second rod 36 is an axial member arranged in the first rod 136. The second rod 36 has a clearance from a through hole 136e of the first rod 136 so as to be relatively moved with respect to the core 32 and the first rod 136. One end portion 36e of the second rod 36 is fixed to the plunger 35, and the locking portion 26 is fitted and fixed to the other end portion 36h of the second rod 36.

The locking portion 26 forming part of the second rod 36 will be described. The locking portion 26 is a disc plate shaped member in which a base portion 26a is formed and brim portions are formed from the base portion 26a on both sides in the axial direction. One of the brim portions functions as the auxiliary valve seat 26c to be separated from and connected to the auxiliary valve portion 23d of the adapter 23, and the other brim portion functions as a pressing portion 26d to be separated from and connected to the flange portion 24d of the pressure-sensitive body 24 so as to extend and contract the pressure-sensitive body 24. A distribution hole 26f through which the coolant is distributed is formed in the base portion 26a of the locking portion 26. The locking portion 26 may be integrated with the second rod 36 or the locking portion 26 may be fitted and fixed to the second rod 36 and integrally formed.

Between the core 32 and the plunger 35, the spring 137 (first biasing member according to the present invention) that biases and separates the plunger 35 from the core 32, and a spring 37 (second biasing member according to the present invention) are arranged.

The spring 137 is arranged between the plunger 35 and the core 32. Specifically, one end of the spring 137 is in contact with the end portion 136a of the first rod 136, the other end is in contact with the end portion 36m of the second rod 36 fixed to the plunger 35, the first rod 136 and the plunger 35 are biased in the direction in which the first rod and the plunger are separated from each other, and the valve element 20 is biased in the valve closing direction of the main valve 27b. The spring 137 is assembled between the first rod 136 and the second rod 36 in a state where the spring is compressed by a predetermined amount from natural length, that is, in a state where the spring has an initial set load. Thereby, the spring 137 is not deformed with drive force of the solenoid 30 being not more than the initial set load, and the first rod 136 and the second rod 36 are integrally moved. The spring 137 is deformed upon exceeding the initial set load, and the first rod 136 and the second rod are relatively moved. The initial set load of the spring 137 is set to be larger than the drive force of the solenoid 30 at the time of controlling the capacity control valve 1. The spring 137 may be arranged so that the one end is in contact with the end portion 136a of the first rod 136 and the other end is in contact with the plunger 35.

The spring 37 is arranged between the plunger 35 and the core 32. Specifically, one end of the spring 37 is in contact with an end portion of the center post 32a, the other end is in contact with an end portion of the plunger 35, and the core 32 and the plunger 35 are biased in the direction in which the core and the plunger are separated from each other. An initial set load of the spring 37 is small, the spring 37 is deformed in proportion to the drive force of the solenoid 30, and the second rod 36 is relatively moved with respect to the core 32 in accordance with the drive force of the solenoid 30.

Actions of the capacity control valve 1 having the configuration described above will be described. A flow passage running from the third communication passage 13 to the first communication passage 11 through the intermediate communication passage 29 will be called as the "Pc-Ps flow passage" below. A flow passage running from the second communication passage 12 to the third communication passage 13 through the valve hole 17 will be called as the "Pd-Pc flow passage" below.

First, movement of the first rod 136 and the second rod 36 and movement of the valve portions of the valve element 20 will be described. First of all, based on FIGS. 1 and 2, the movement of the first rod 136 and the second rod 36 and the movement of the valve portions of the valve element 20 in a non-energized state of the solenoid 30 will be described. In a non-energized state, the plunger 35 is pushed upward by biasing force of the pressure-sensitive body 24 and biasing force of the spring 37 (FIG. 1), the main valve portion 21c of the valve element 20 is fully opened, and the shut-off valve portion 21a is fully closed. The locking portion 26 of the second rod 36 is brought into contact with the adapter 23 and the auxiliary valve 27c is closed.

Figure 3:
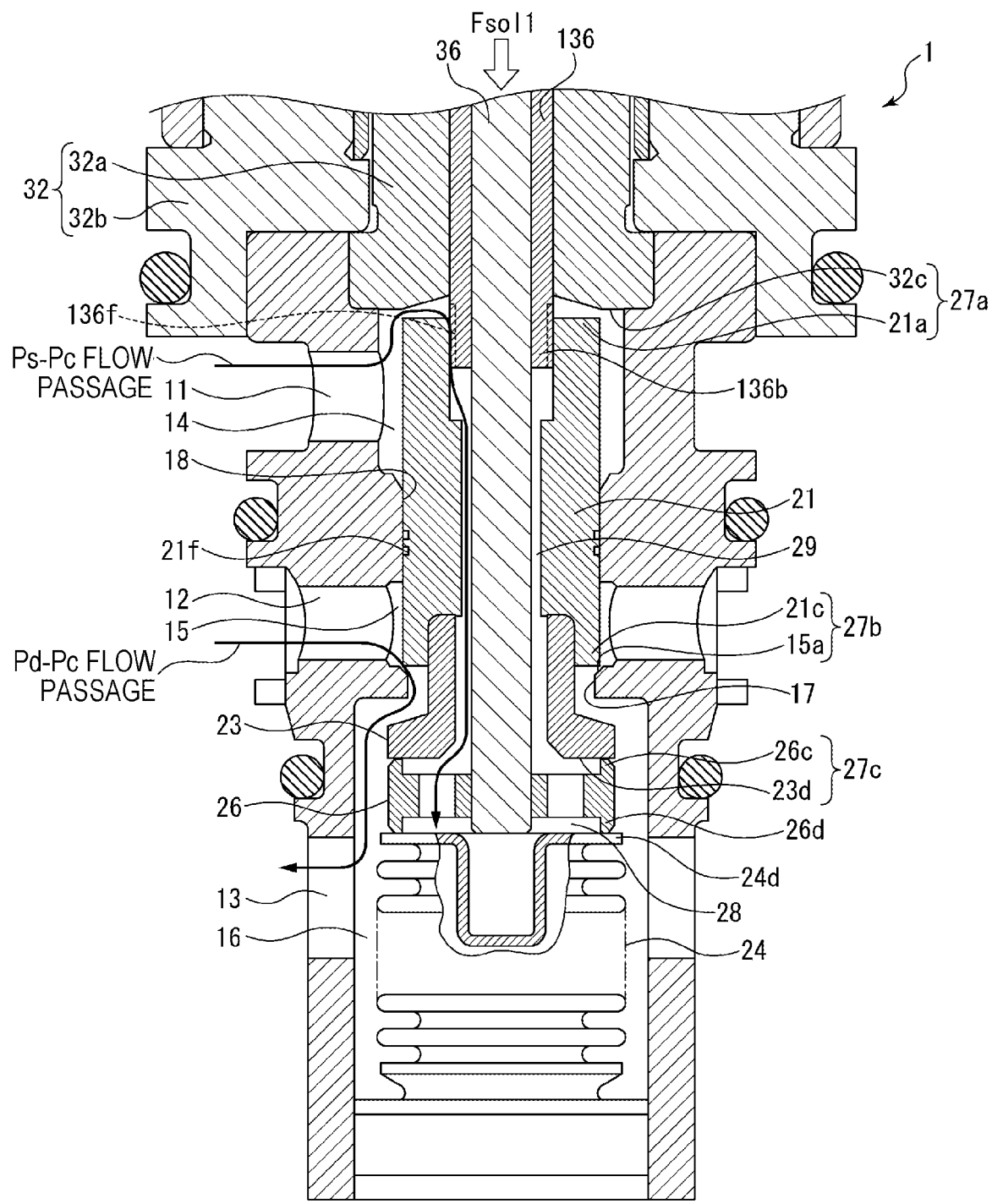
FIG. 3 is an enlarged view of part of the valve main body, the valve element, and the solenoid of FIG. 1 showing a control state of the capacity control valve.

Next, based on FIG. 3, the movement of the first rod 136 and the second rod 36 and the movement of the valve portions of the valve element 20 in a state where energization of the solenoid 30 is started from a non-energized state and the main valve 27b is opened will be described. Since the initial set load of the spring 137 is set to be larger than the drive force of the solenoid 30 at the time of controlling the capacity control valve 1, in a state where the main valve 27b is opened, the first rod 136 and the second rod 36 are integrally moved in a state where relative positions are maintained. First, when energization of the solenoid 30 is started from a non-energized state, the first rod 136 and the second rod 36 are integrally and gradually driven in the forward direction (direction in which the first rod 136 and the second rod 36 pop out from the end portion 32c of the core 32 to the outside). Thereby, the shut-off valve portion 21a is separated from the end portion 32c of the core 32, the shut-off valve 27a is opened from a fully closed state, and the main valve 27b is gradually narrowed down from a fully opened state. At the time of controlling the capacity control valve 1, the valve element 20 connected to the first rod 136 and the second rod 36 are integrally displaced. Thus, the capacity control valve 1 can stably control an opening degree of the main valve 27b.

Figure 4:
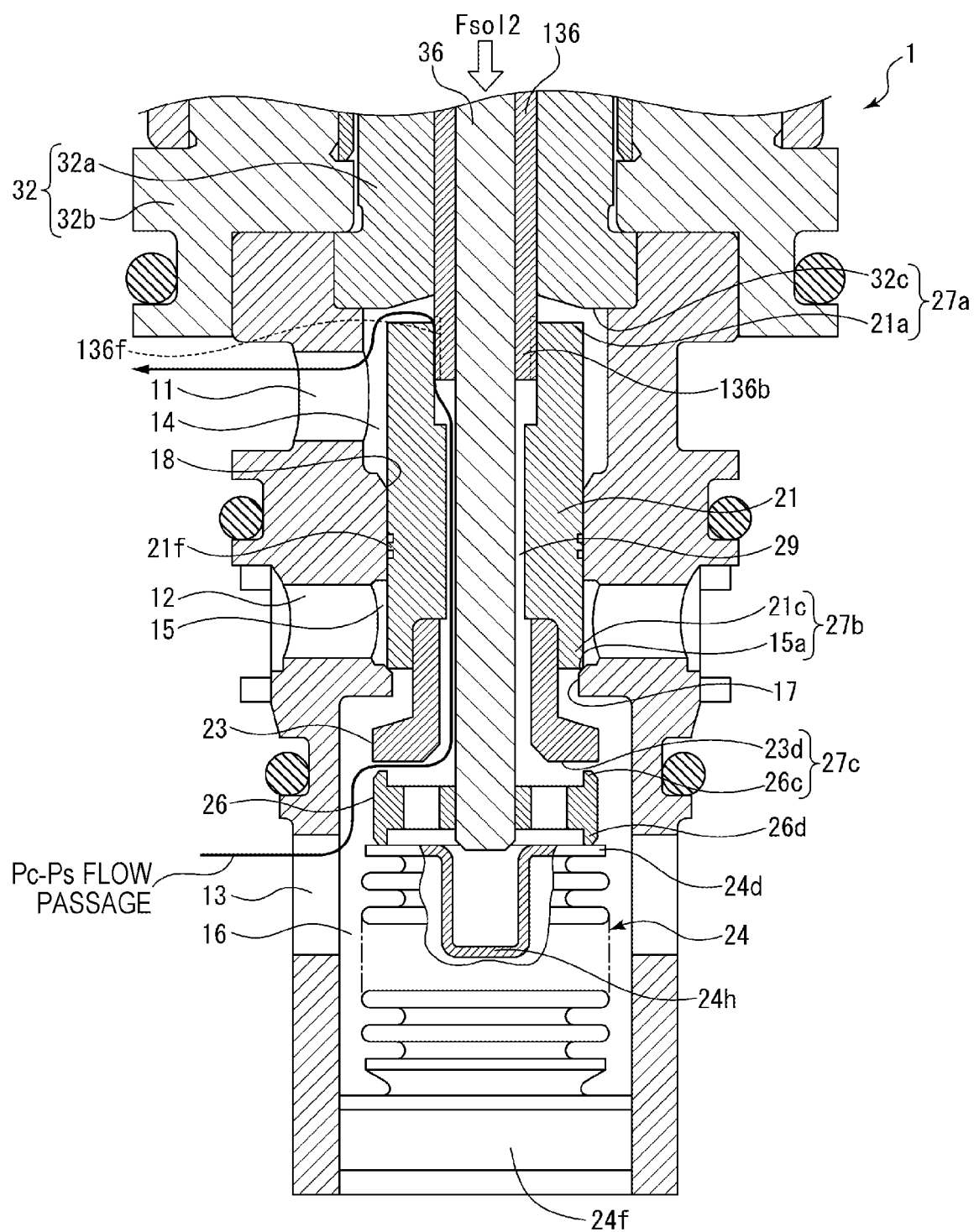
FIG. 4 is an enlarged view of part of the valve main body, the valve element, and the solenoid of FIG. 1 showing a state of the capacity control valve at the time of liquid coolant discharge.
Figure 5:
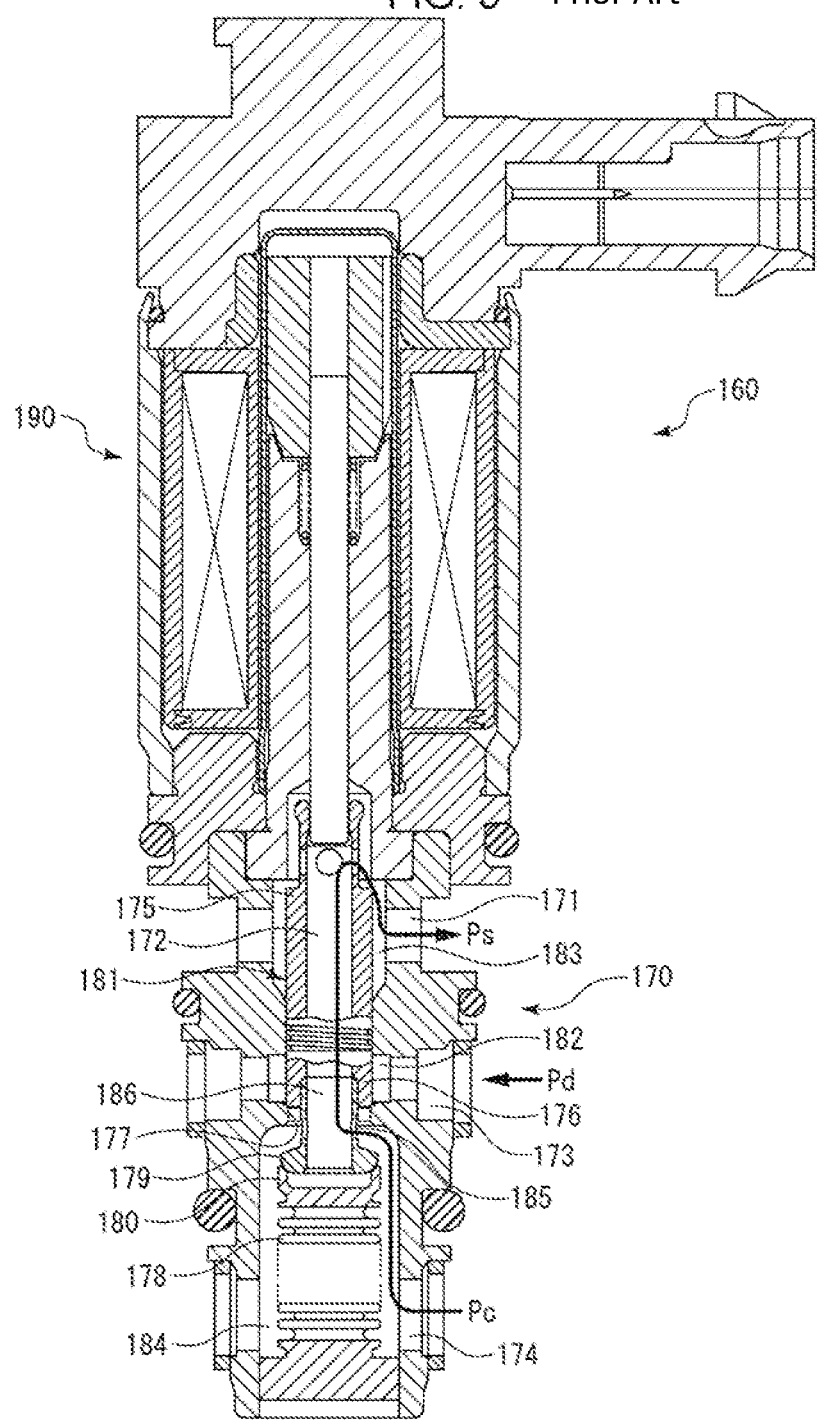
FIG. 5 is a front sectional view showing a conventional capacity control valve.
Figure 6:
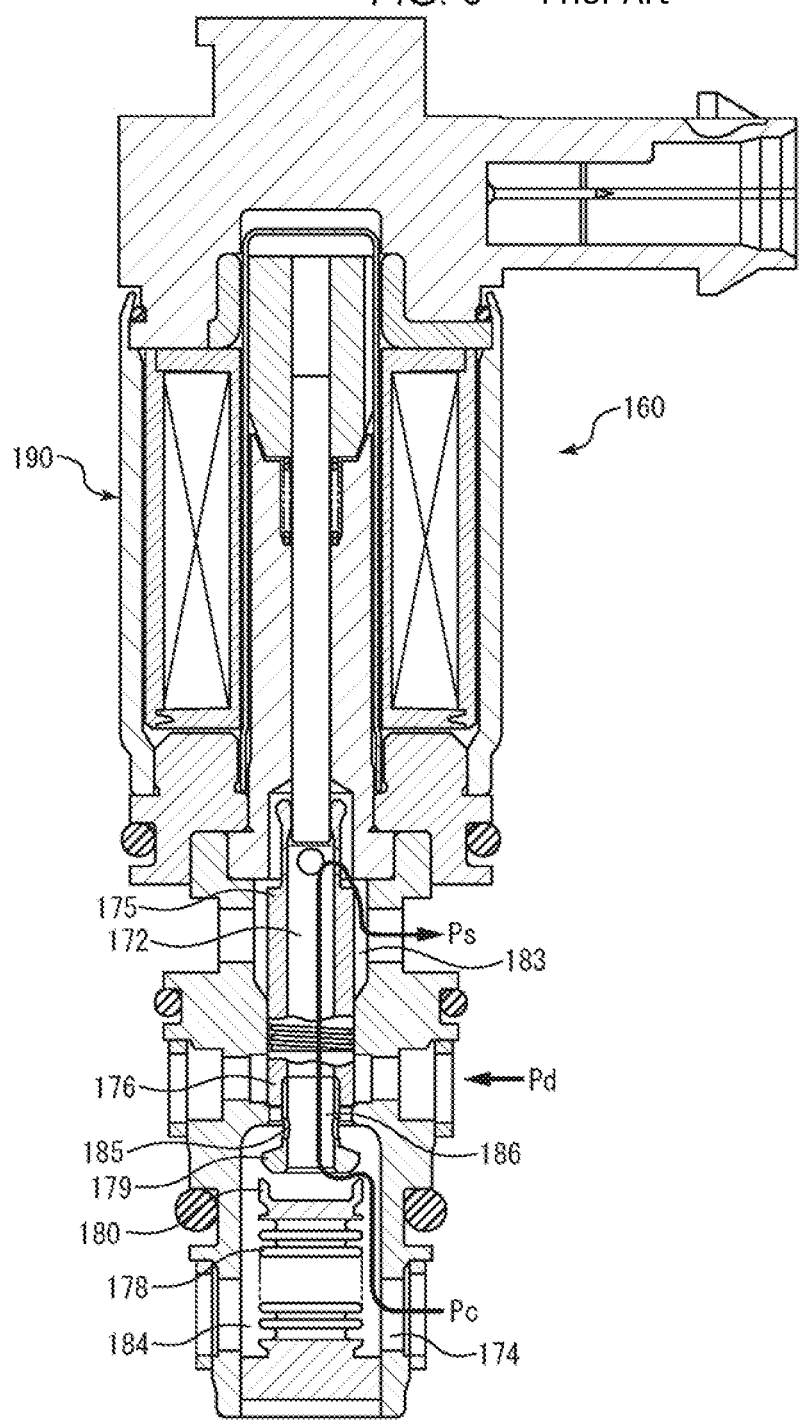
FIG. 6 shows a state of the conventional capacity control valve at the time of liquid coolant discharge.

Further, when the first rod 136 and the second rod 36 are driven in the forward direction, as shown in FIG. 4, the shut-off valve 27a is brought into a fully opened state, the main valve portion 21c is brought into contact with the main valve seat 15a, the main valve 27b is brought into a fully closed state, and the movement of the first rod 136 and the valve element 20 is stopped. That is, when the solenoid 30 is further driven in a state where the first rod 136 and the valve element 20 are stopped, that is, in a state where the main valve 27b is fully closed, the drive force of the solenoid 30 exceeds the initial set load of the spring 137, the spring 137 is deformed, and relative movement of the second rod 36 with respect to the first rod 136 is started. Thus, the locking portion 26 of the second rod 36 is separated from the auxiliary valve seat 26c and the auxiliary valve 27c is opened. Further, when the second rod 36 is driven, the spring 137 is deformed, the pressing portion 26d of the locking portion 26 presses the flange portion 24d, and the pressure-sensitive body 24 is contracted, so that it is possible to bring the auxiliary valve 27c into a fully opened state. When the pressure-sensitive body 24 is contracted by a predetermined amount, a projected portion 24h of the flange portion 24d and a projected portion (not shown) provided in the partition adjusting portion 24f are brought into contact with each other, deformation of the pressure-sensitive body 24 is stopped, and the movement of the second rod 36 is also stopped.

The movement of the first rod 136 and the second rod 36 and the movement of the valve portions of the valve element 20 are described above. Next, actions of the capacity control valve 1 and the variable capacity compressor will be described based on FIG. 3. First, a control state of the capacity control valve 1 will be described. The control state is a state where the auxiliary valve 27c is in a closed state, the opening degree of the main valve 27b is set to an opening degree determined in advance, and pressure of the suction chamber of the variable capacity compressor is controlled to be a set value Pset. In this state, the fluid of the suction pressure Ps from the suction chamber of the variable capacity compressor passes from the first communication passage 11, the first valve chamber 14, and the communication groove 136f through to the intermediate communication passage 29, flows to an internal space 28 surrounded by the locking portion 26 of the second rod 36 and the pressure-sensitive body 24, and acts on the pressure-sensitive body 24. As a result, the main valve portion 21c is stopped at a position where force in the valve opening direction by the spring 37, force by the solenoid 30, and force by the pressure-sensitive body 24 to be extended and contracted in accordance with the suction pressure Ps are balanced, and the pressure of the suction chamber of the variable capacity compressor is controlled to be the set value Pset. However, even when the opening degree of the main valve 27b is set to the opening degree determined in advance, there is sometimes a case where the pressure Ps of the suction chamber is varied with respect to the set value Pset due to disturbance, etc. For example, when the pressure Ps of the suction chamber is increased to be more than the set value Pset due to disturbance, etc., the pressure-sensitive body 24 is contracted and the opening degree of the main valve 27b is decreased. Thereby, since the Pd-Pc flow passage is narrowed down, an amount of the fluid of the discharge pressure Pd flowing in from the discharge chamber to the crank chamber is reduced and pressure of the crank chamber is lowered. As a result, a tilting angle of a swash plate of the compressor is increased, a discharge capacity of the compressor is increased, and discharge pressure is lowered. On the contrary, when the pressure Ps of the suction chamber is decreased to be lower than the set value Pset, the pressure-sensitive body 24 is extended and the opening degree of the main valve 27b is increased. Thereby, since the Pd-Pc flow passage is increased, the amount of the fluid of the discharge pressure Pd flowing in from the discharge chamber to the crank chamber is increased and the pressure of the crank chamber is increased. As a result, the tilting angle of the swash plate of the compressor is decreased, the discharge capacity of the compressor is reduced, and the discharge pressure is increased. In this way, by the capacity control valve 1, it is possible to control the pressure of the suction chamber of the variable capacity compressor to be the set value Pset.

Next, a liquid coolant discharge state of the capacity control valve 1 will be described based on FIG. 4. After the compressor is stopped for a long time, a liquid coolant (made by cooling and liquefying a coolant during abandonment) is accumulated in the crank chamber. Thus, in order to ensure predetermined discharge pressure and a predetermined discharge flow rate after start-up of the compressor, there is a need for discharging the liquid coolant as soon as possible. At the time of liquid coolant discharge, since pressure of the third valve chamber 16 communicating with the crank chamber and the suction pressure Ps are high pressure, and the pressure-sensitive body 24 is contracted, the auxiliary valve 27*c* is opened. By opening the auxiliary valve 27*c*, it is possible to discharge the liquid coolant from the crank chamber to the suction chamber via the Pc-Ps flow passage. However, as discharge of the liquid coolant progresses, the pressure of the crank chamber and the suction pressure Ps are lowered. Thus, the opening degree of the auxiliary valve 27*c* is gradually decreased. Therefore, it takes time to completely discharge the liquid coolant. Meanwhile, in the capacity control valve 1 of the present invention, by driving the solenoid 30 in the forward direction and pressing the pressure-sensitive body 24 by the locking portion 26 of the second rod 36, it is possible to forcibly maintain the auxiliary valve 27*c* in a fully opened state. Thus, an opening degree of the auxiliary valve portion 23*d* is not changed from start of the liquid coolant discharge to completion of the liquid coolant discharge, and it is possible to discharge the liquid coolant from the crank chamber to the suction chamber via the Pc-Ps flow passage for a short time.

Conventionally, at the time of a liquid coolant discharging operation, focus is placed only on how quickly discharge of the liquid coolant is completed. Thus, there is sometimes a case where an engine load becomes excessive during the liquid coolant discharging operation. With the capacity control valve 1 according to the present invention, even at the time of the liquid coolant discharge, it is possible to rapidly drive the valve element 20. At the time of the liquid coolant discharge, actions of the capacity control valve 1 when the engine load is reduced will be described.

In a case where the engine load is rapidly reduced at the time of the liquid coolant discharge, the solenoid 30 is turned off and magnetic attracting force Fsol between the core 32 and the plunger 35 is operated to be zero. Since settings is made to cancel upward pressure and downward pressure acting on the valve element 20 at the time of the liquid coolant discharge, regarding major force acting on the valve element 20 at the time of the liquid coolant discharge, the biasing force of the spring 37 acting in the valve opening direction of the main valve 27*b*, and the total force of biasing force of the spring 137 acting in the valve closing direction of the main valve 27*b* and the magnetic attracting force Fsol of the solenoid 30 are balanced. When the magnetic attracting force Fsol of the solenoid 30 becomes zero, the biasing force of the spring 37 acting in the valve opening direction of the main valve 27*b* becomes dominant, and the second rod 36 is moved upward. As a result, the second rod 36 is rapidly pushed up, the locking portion 26 is brought into contact with the adapter 23, the valve element 20 is driven in the valve opening direction of the main valve 27*b*, and the main valve 27*b* is rapidly fully opened. When the main valve 27*b* is fully opened, a coolant amount flowing from the discharge chamber of the compressor to the crank chamber through the Pd-Pc flow passage is increased, the pressure Pc in the crank chamber is increased, and the compressor is operated by the minimum capacity. In this way, as the time of the liquid coolant discharge, even in a state where the auxiliary valve 27*c* is in an opened state and no force acts on the valve element 20 from the pressure-sensitive body 24, it is possible to reduce the load of the compressor and hence it is possible to reduce the engine load even at the time of the liquid coolant discharge.

In the control state where the pressure of the suction chamber of the compressor is controlled to be the set value Pset by the capacity control valve 1, and in a case where the load of the engine is to be reduced, by bringing the solenoid 30 into a non-energized state similarly to the above description, the main valve 27*b* is brought into a fully opened state, the coolant amount of the Pd pressure flowing from the discharge chamber of the compressor to the crank chamber through the Pd-Pc flow passage is increased, and the compressor is operated by the minimum capacity, so that it is possible to perform an operation with which the load of the engine is reduced.

In this way, the initial set load of the spring 137 is set to be larger than the drive force of the solenoid 30 at the time of controlling the capacity control valve 1. Thus, in a state where the main valve 27*b* is opened, the spring 137 is hardly deformed. Therefore, the valve element 20 connected to the first rod 136 and the second rod 36 are integrally displaced. Thus, the capacity control valve 1 can stably control the opening degree of the main valve 27*b*. As the time of the liquid coolant discharge of the capacity control valve 1, in a case where the drive force of the solenoid 30 exceeds the initial set load of the spring 137, the spring 137 is deformed, the second rod 36 is relatively moved with respect to the first rod 136, and the locking portion 26 of the second rod 36 is separated from the auxiliary valve seat 26*c*, so that it is possible to forcibly open the auxiliary valve 27*c*. Thereby, at the time of the liquid coolant discharge, it is possible to maintain the auxiliary valve 27*c* in a fully opened state irrespective of the pressure of the third valve chamber 16 and the suction pressure Ps. Thus, it is possible to discharge the liquid coolant from the crank chamber to the suction chamber via the Pc-Ps flow passage for a short time.

The embodiment of the present invention is described with the drawings above. Specific configurations are not limited to the embodiment but the present invention also includes changes and additions within the range not departing from the gist of the present invention.

In the above embodiment, the first pressure of the first valve chamber 14 is the suction pressure Ps of the variable capacity compressor, the second pressure of the second valve chamber 15 is the discharge pressure Pd of the variable capacity compressor, and the third pressure of the third valve chamber 16 is the pressure Pc of the crank chamber of the variable capacity compressor. However, the present invention is not limited to this but with the first pressure of the first valve chamber 14 being the pressure Pc of the crank chamber of the variable capacity compressor, the second pressure of the second valve chamber 15 being the discharge pressure Pd of the variable capacity compressor, and the third pressure of the third valve chamber 16 being the suction pressure Ps of the variable capacity compressor, it is possible to respond to various variable capacity compressors.

REFERENCE SIGNS LIST 1 capacity control valve
10 valve main body
11 first communication passage
12 second communication passage
13 third communication passage
14 first valve chamber
15 second valve chamber
15a main valve seat
16 third valve chamber
17 valve hole
20 valve element
21 main valve element
21a shut-off valve portion
21c main valve portion
23 adaptor
23d auxiliary valve portion
24 pressure-sensitive body
24a bellows
24d flange portion
26 locking portion
26c auxiliary valve seat
26d pressing portion
27a shut-off valve
27b main valve
27c auxiliary valve
29 intermediate communication passage
30 solenoid
31 electromagnetic coil
32 core
35 plunger
36 second rod
136 first rod
37 spring (second biasing member)
137 spring (first biasing member)
Fsol magnetic attracting force
Ps suction pressure (first pressure) (third pressure)
Pd discharge pressure
Pc control chamber pressure (third pressure) (first pressure)
Pset suction pressure set value

The invention claimed is:

1. A capacity control valve that controls a flow rate or pressure of a variable capacity compressor in accordance with a valve opening degree of a valve portion, the capacity control valve being characterized by comprising:
(i) a valve main body having:
a first communication passage through which a fluid of first pressure passes,
a first valve chamber communicating with the first communication passage,
a second communication passage arranged adjacent to the first communication passage, the second communication passage through which a fluid of second pressure passes,
a second valve chamber communicating with the second communication passage,
a third communication passage through which a fluid of third pressure passes,
a third valve chamber communicating with the third communication passage, and
a main valve seat arranged in a valve hole which provides communication between the second communication passage and the third communication passage;
(ii) a valve element having:
an intermediate communication passage providing communication between the first communication passage and the third communication passage,
a main valve portion arranged in the second valve chamber, and
an auxiliary valve portion arranged in the third valve chamber and at an end of the intermediate communication passage; and
(iii) a pressure-sensitive body arranged in the third valve chamber and extending or contracting in accordance with surrounding pressure;
(iv) a solenoid having:
an electromagnetic coil,
a plunger,
a core having a second cylindrical through hole in an axial direction and arranged between the plunger and the valve main body,
a first rod arranged inside the second cylindrical through hole of the core and having a first cylindrical through hole in the axial direction,
a second rod arranged inside the first cylindrical through hole of the first rod, and
a first spring and a second spring arranged between the plunger and the core,
wherein the first rod has one end driven by the plunger via the first spring, and another end coupled to the valve element,
the second rod has one end coupled to the plunger, and another end coupled to an auxiliary valve seat,
the first rod driven by the plunger via the first spring alternatively opens and closes the valve hole by detaching and touching the main valve portion from and to the main valve seat, respectively, and
the second rod driven by the plunger alternatively opens and closes the intermediate communication passage by detaching and touching the auxiliary valve portion from and to the auxiliary valve seat, respectively.

2. The capacity control valve according to claim 1, characterized in that the first pressure is suction pressure of the variable capacity compressor, the second pressure is discharge pressure of the variable capacity compressor, and the third pressure is pressure of a crank chamber of the variable capacity compressor.

3. A method for controlling a capacity control valve, characterized by comprising the step of:
by using the capacity control valve according to claim 2, making the main valve portion from a closed state to an opened state when the auxiliary valve portion is in an opened state.

4. The capacity control valve according to claim 1, characterized in that the first pressure is pressure of a crank chamber of the variable capacity compressor, the second pressure is discharge pressure of the variable capacity compressor, and the third pressure is suction pressure of the variable capacity compressor.

5. A method for controlling a capacity control valve, characterized by comprising the step of:
by using the capacity control valve according to claim 1, making the main valve portion from a closed state to an opened state when the auxiliary valve portion is in an opened state.

6. The capacity control valve according to claim 1, characterized in that the first spring is arranged between the first rod and the second rod and has an initial set load in a direction of biasing the main valve portion in a valve closing direction in a manner that the first rod and the second rod move while maintaining their relative positions when a drive force of the solenoid is not more than the initial set load, and the second rod moves relative to the valve element when the drive force of the solenoid exceeds the initial set load.

* * * * *